US006647788B2

(12) United States Patent
Murai et al.

(10) Patent No.: US 6,647,788 B2
(45) Date of Patent: Nov. 18, 2003

(54) ACCELERATION DETECTING DEVICE

(75) Inventors: Eiichiro Murai, Tokyo (JP); Tohru Matsumoto, Tokyo (JP); Yuji Hiraoka, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 95 days.

(21) Appl. No.: 09/908,644

(22) Filed: Jul. 20, 2001

(65) Prior Publication Data

US 2002/0095991 A1 Jul. 25, 2002

(30) Foreign Application Priority Data

Jan. 23, 2001 (JP) ....................................... 2001-014896

(51) Int. Cl.[7] ............................................... G01P 15/00
(52) U.S. Cl. .............................. 73/514.01; 200/61.45 R
(58) Field of Search ................ 73/514.01; 200/61.45 R, 200/61.53

(56) References Cited

U.S. PATENT DOCUMENTS 3,649,788 A * 3/1972 Heckendork ........... 20/61.45 R
5,126,515 A * 6/1992 Sugimoto ............ 200/61.45 R

FOREIGN PATENT DOCUMENTS

| | | | |
|---|---|---|---|
| JP | 9-211023 | 8/1997 | ......... G01P/15/135 |
| JP | 11-44707 | 2/1999 | ......... G01P/15/135 |

* cited by examiner

*Primary Examiner*—Richard A. Moller
(74) *Attorney, Agent, or Firm*—Sughrue Mion, PLLC

(57) ABSTRACT

An acceleration detecting device comprising a movable weight, a movable electric contact disposed on the weight, a fixed electric contact, an resilient member, and a friction creating mechanism. The movable electric contact slides on the fixed electric contact when a force is given to the weight for moving the weight in a first direction. The resilient member urges the weight continually in a second direction opposing to the first direction. The friction creating mechanism gives a frictional force to the weight when the weight travels a distance in excess of a certain amount in the first direction. The friction creating mechanism increases the frictional force as the weight continues to advance further in the first direction.

12 Claims, 4 Drawing Sheets

ACCELERATION DETECTING DEVICE

BACKGROUND OF THE INVENTION

1. Field of the Invention

The present invention relates to an acceleration detecting device including a fixed electric contact and a movable electric contact capable of coming into contact with the fixed electric contact at an acceleration of more than a certain amount 2. Prior Art This kind of acceleration detecting device is utilized in, e.g., a conveyance, such as a motor vehicle for actuating an air bag in the event of collision. For example, JP-A-9-211023 discloses this kind of acceleration detecting device. FIG. 7 is a sectional view showing a conventional acceleration detecting device disclosed in JP-A-9-211023. As shown in FIG. 7, the acceleration detecting device comprises a weight 1, a housing 2, movable electric contacts 3*a* and 3*b*, a coil spring 4, fixed electric contacts 5*a* and 5*b*, and a guide shaft 11. The housing 2 defines a hollow or cavity where a straight guide shaft 11 is disposed in such a manner that the longitudinal axis thereof is aligned with the center axis of the cavity. The weight 1 is slidably mounted on the guide shaft 11.

The housing 2 has end walls 12 and 13 at which the guide shaft 11 terminates. The guide shaft 11 passes through the coil spring 4 that is arranged between the left end wall 12 and weight 1. As indicated by the imaginary line in FIG. 7, the restituting force of the coil spring 4 presses the weight 1 into the right end wall 13 at an ordinary state wherein no or little force is applied to the weight 1. When a large acceleration is applied to an apparatus, such as an automobile into which the acceleration detecting device is incorporated, a powerful force that is greater than the resilient force of the coil spring 4 may be exerted leftward, so that the weight 1 travels leftward and finally enters the cavity of the housing 2 as indicated by the solid line in FIG. 7.

Fixed electric contacts 5*a* and 5*b* made of a conductor are fixedly secured to inner surfaces of the upper and lower walls of the housing 2, respectively. Movable electric contacts 3*a* and 3*b* manufactured of a conductor are mounted on the weight 1. While the weight 1 travels and stays within the cavity of the housing 2, the movable electric contacts 3*a* and 3*b* are in contact with the fixed electric contacts 5*a* and 5*b*, respectively. Although not apparently shown in the drawings, the movable electric contacts 3*a* and 3*b* are interconnected inside the weight 1. Accordingly, contacting between the electric contacts 3*a* and 5*a* and between the electric contacts 3*b* and 5*b* results in the creation of an electrical connection between the fixed electric contacts 5*a* and 5*b*.

Next, operations of the acceleration detecting device will be described,

When a force greater than a certain level is exerted leftward, the weight 1 slides on the guide shaft 11 and enters the cavity of the housing 2. When the movable electric contacts 3*a* and 3*b* come into contact with the fixed electric contacts 5*a* and 5*b*, the fixed electric contacts 5*a* and 5*b* are connected electrically with each other, so that an electric power is provided to an end effector, for example, an air bag activator. In other words, it can be detected that an acceleration of more than a certain amount is applied.

It is preferred that the movable electric contacts are in continual contact with the fixed electric contacts during the travel of the weight 1 in the cavity of the housing 2. Therefore, the spring constant of the coil spring 4, the length of the housing 2 along its longitudinal direction, the length of the fixed electric contacts 5*a* and 5*b*, and the stroke of the weight 1 are determined on the basis of the maximum extent of expected acceleration or external force.

However, if the external force is greater than the calculated maximum, the weight 1 may collide against the left end wall 12 that is the stroke limit for the weight 1 in the housing 2. This may cause instability of the electrical connection between the electric contacts. More specifically, if the weight 1 collides with the end wall 12, the backlash causes the movable electric contacts 3*a* and 3*b* to oscillate or vibrate as indicated by arrow A and the oscillation or vibration may continue for a while. In addition, it is possible that the weight 1 rebounds from the end wall 12 and exits from the cavity of the housing 2 with the result that the electrical connection between the electric contacts is interrupted. In this event, although a great acceleration is exerted, the time period of electrical interconnection may be too short to drive the end effector.

To avoid this consequence, some acceleration detecting devices are provided with cushions made of rubber and the like. Such a cushion is located at the position where the weight and the housing are likely to collide with each other in order to dampen shocks and reduce the velocity of the weight, thereby ensuring a sufficient time of electrical interconnection when a collision of a vehicle occurs.

However, with reference to such a conventional cushion made of rubber and the like, the hardness or the modulus of elasticity of the cushion may vary according to temperature, so that the expected buffering effect is not guaranteed. Especially, temperature is remarkably changeable and inconstant in a vehicle such as an automobile.

Furthermore, in accordance with a conventional device, it is inevitable to conduct a careful designing of elements, such as lengthening the stroke of the weight in order to ensure a sufficient time of electrical interconnection that is necessary for guaranteeing safety in a vehicle.

SUMMARY OF THE INVENTION

Accordingly, it is an object of the present invention to provide an acceleration detecting device that is not significantly affected by an environmental temperature and can ensure a sufficient time of electrical connection when an acceleration greater than a certain amount is exerted.

In accordance with an aspect of the present invention, an acceleration detecting device comprises a movable weight, a movable electric contact disposed on the weight, a fixed electric contact, an resilient member, and a friction creating mechanism. The movable electric contact slides on the fixed electric contact when a force is given to the weight for moving the weight in a first direction. The resilient member urges the weight continually in a second direction opposing to the first direction. The friction creating mechanism gives a frictional force to the weight when the weight travels a distance in excess of a certain amount in the first direction. The friction creating mechanism increases the frictional force as the weight continues to advance further in the first direction.

In a preferred embodiment, the friction creating mechanism includes a fixed brake fixedly arranged in place and a movable brake disposed on the weight. The movable brake may come into contact with the fixed brake for initiating the application of a frictional force to the fixed brake when the weight travels a distance in excess of a certain amount in the first direction.

At least one of the fixed brake and the movable brake may be elastically deformable and may generate a frictional component derived from elastic deformation thereof as a component of the frictional force.

Preferably, the elastic deformation of at least one of the fixed brake and the movable brake may progress as the weight continues to advance further in the first direction after the movable brake comes into contact with the fixed brake.

The movable brake may be formed as an integral part of an element that incorporates the movable electric contact.

In another preferred embodiment, the friction creating mechanism may include a protrusion fixedly arranged in place, a leaf spring disposed on the weight, a fixed brake fixedly arranged in place, and a movable brake. The leaf spring comes into contact with the protrusion for commencing to deform elastically when the weight travels a distance in excess of a certain amount in the first direction. The movable brake is capable of being in contact with the fixed brake. The movable brake progresses the deformation and increases the frictional force to the fixed brake for the increase of elastic deformation of the leaf spring.

Preferably, a depression is formed on the weight for receiving the protrusion so as to enable the leaf spring to deform elastically after the leaf spring comes into contact with the protrusion.

Preferably, the leaf spring is formed as an integral part of an element that incorporates the movable brake.

The movable brake may be the movable electric contact while the fixed brake may be the fixed electric contact.

BRIEF DESCRIPTION OF THE DRAWINGS

With reference to the accompanying drawings, various embodiments of the present invention will be described hereinafter. In the drawings.

DETAILED DESCRIPTION OF PREFERRED EMBODIMENTS

First Embodiment

Figure 1:
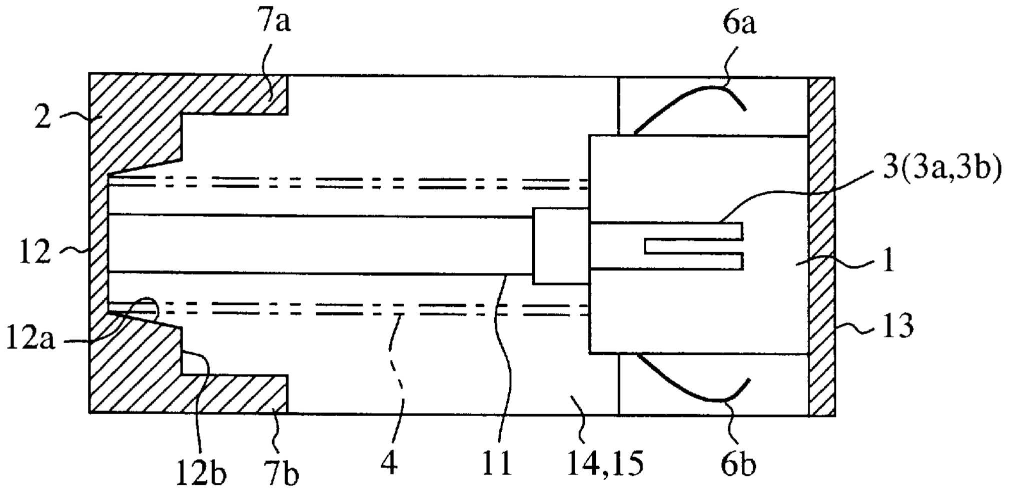
FIG. 1 is a plane sectional view of an acceleration detecting device according to a first embodiment of the present invention when no acceleration is exerted on the device.
Figure 2:
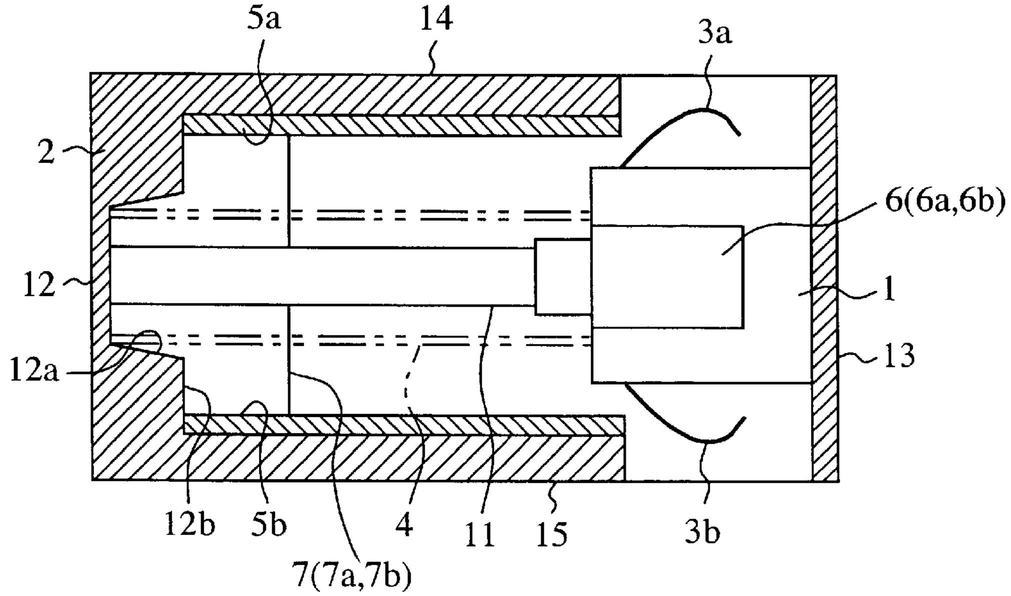
FIG. 2 is a side sectional view of the acceleration detecting device in FIG. 1 when no acceleration is exerted on the device.

FIGS. 1 and 2 are sectional views showing an acceleration detecting device of a first embodiment in accordance with the present invention when no acceleration occurs. As shown in FIGS. 1 and 2, the acceleration detecting device comprises a weight 1, a housing 2, movable electric contacts 3*a* and 3*b*, an elastic member or coil spring 4, fixed electric contacts 5*a* and 5*b*, and a guide shaft 11. The housing 2 has upper and lower walls 14 and 15 as shown in FIG. 2.

The housing 2 is manufactured of a material with a high rigidity, such as a plastic material. The upper and lower walls 14 and 15 define a hollow or cavity therebetween. In the cavity, a straight guide shaft 11 is disposed in such a manner that the longitudinal axis thereof is aligned with the center axis of the cavity. The weight 1 is slidably mounted on the guide shaft 11.

Figure 4:
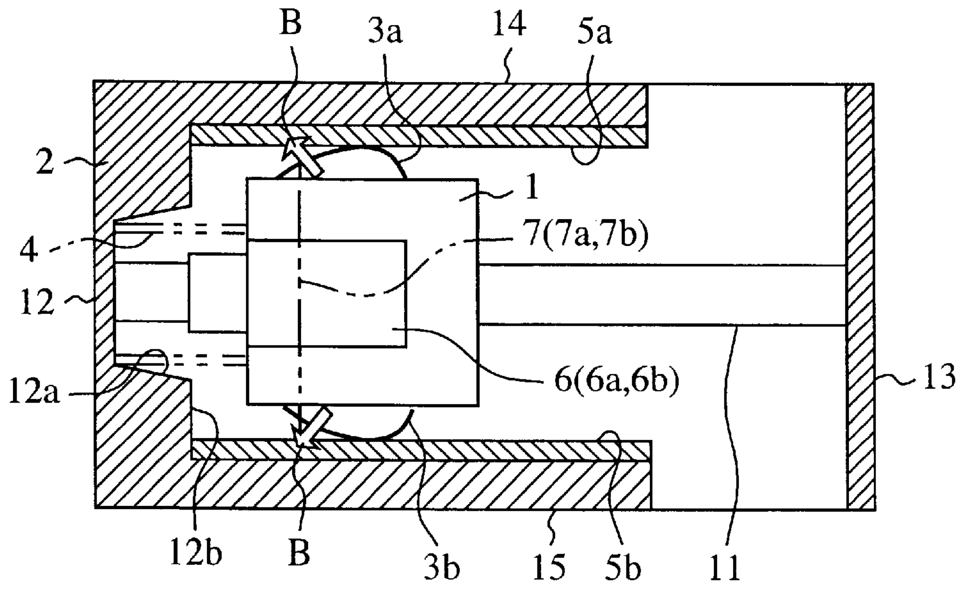
FIG. 4 is a side sectional view of the acceleration detecting device in FIG. 1 when an acceleration is exerted on the device.

The housing 2 has end walls 12 and 13 at which the guide shaft 11 terminates. The guide shaft 11 passes through the coil spring 4 that is arranged between the left end wall 12 and weight 1. The rightward restituting force of the coil spring 4 is continually applied to the weight 1 and presses the weight 1 into the right end wall 13, as illustrated, at an ordinary state wherein no or little force is applied to the weight 1. When a great acceleration is applied to an apparatus, such as an automobile into which the acceleration detecting device is incorporated, a powerful force that is greater than the urging force of the coil spring 4 may be exerted leftward, so that the weight 1 travels leftward and finally enters the cavity of the housing 2 as illustrated in FIG. 4.

Fixed electric contacts 5*a* and 5*b* made of a conductor are fixedly secured to inner surfaces of the upper and lower walls of the housing 2, respectively. The fixed electric contacts 5*a* and 5*b* are planar plates arranged in parallel. Movable electric contacts 3*a* and 3*b* manufactured of a conductor are mounted on the weight 1. While the weight 1 travels and stays within the cavity of the housing 2, the movable electric contacts 3*a* and 3*b* are in contact with the fixed electric contacts 5*a* and 5*b*, respectively. Although not apparently shown in the drawings, the movable electric contacts 3*a* and 3*b* are interconnected inside the weight 1. For example, the movable electric contacts 3*a* and 3*b* are elongated parts of a single conductor element. Accordingly, contacting between the electric contacts 3*a* and 5*a* and between the electric contacts 3*b* and 5*b* results in the creation of an electrical connection between the fixed electric contacts 5*a* and 5*b*.

One end of each of the movable electric contacts 3*a* and 3*b* is attached to a part near an end of the weight 1 in proximity of the left end wall 12. The movable electric contacts 3*a* and 3*b* are skewed, such that the distance between the center axis of the weight 1 and each movable electric contact increases as the distance from the end wall 12 increases.

The left end wall 12 has a hole or recess 12*a* receiving the left end of the coil spring 4, and therefore the end wall 12 has a step-like inner surface 12*b*. The inner surface 12*b* faces to the left end surface of the weight 1 although they are apart from each other when no or little acceleration occurs.

A pair of decelerating contacts 6*a* and 6*b*, as movable brakes of a friction creating mechanism, are attached to the weight 1. A pair of fixed decelerating overhangs 7*a* and 7*b* are, as fixed brakes of the friction creating mechanism, formed at the housing 2, so that they are fixedly arranged in place. The distance between each decelerating contact and each decelerating overhang is shorter than the distance between the inner surface 12*b* of the end wall 12 and the weight 1. Therefore, when the weight 1 slides leftward on account of a large given force, the decelerating contacts 6*a* and 6*b* can come into contact with the decelerating overhangs 7*a* and 7*b* prior to contact of the weight 1 with the inner surface 12*b* of the end wall 12.

The decelerating contacts 6*a* and 6*b* are shaped into leaf springs and formed of a material having a suitable elasticity and an elastic modulus that is not affected by change of temperature significantly. Preferably, the decelerating contacts 6*a* and 6*b* are formed of a metal and/or plastic material or a combination thereof. The decelerating contacts 6*a* and 6*b* may be unitary parts of the element that integrally incorporates the movable electric contacts 3*a* and 3*b*. In an alternative embodiment, the decelerating contacts 6*a* and 6*b* may be formed independently from the movable electric contacts 3*a* and 3*b*.

One end of each of the decelerating contacts 6*a* and 6*b* is attached to a part near an end of the weight 1 in proximity of the left end wall 12. The decelerating contacts 6*a* and 6*b* are skewed, such that the distance between the center axis of the weight 1 and each decelerating contact increases as the distance from the end wall 12 increases. In the illustrated embodiment, the orientation of the decelerating contacts 6*a* and 6*b* is angularly apart from the orientation of the movable electric contacts 3*a* and 3*b* at 90 degrees. However, other suitable angular arrangements may be contemplated.

Next, operations of the acceleration detecting device will be described.

When a force greater than a certain amount is exerted leftward, the weight 1 slides on the guide shaft 11 and enters the cavity between the upper and lower walls 14 and 15 of the housing 2. When the movable electric contacts 3*a* and 3*b* come into contact with the fixed electric contacts 5*a* and 5*b*, the fixed electric contacts 5*a* and 5*b* are connected electrically with each other, so that an electric power is provided to an end effector, for example, an air bag activator. In other words, it can be detected that an acceleration that is greater than a predetermined amount is applied.

In FIG. 4, each arrow B indicates a force applied by the movable electric contact 3*a* or 3*b* to the fixed electric contact 5*a* or 5*b*. The movable electric contacts 3*a* and 3*b* are formed of a suitable elastic material into leaf springs. The maximum distance between the movable electric contacts 3*a* and 3*b* is greater than the interval between the upper and lower walls 14 and 15 when the weight 1 exists outside the cavity of the housing 2. Accordingly, while the weight 1 exists in the cavity, an oblique outward force is continually given by each movable electric contact 3*a* or 3*b* to each fixed electric contact 5*a* or 5*b* as indicated by arrow B, preventing the electric interconnection between the electric contacts from being severed.

Figure 3:
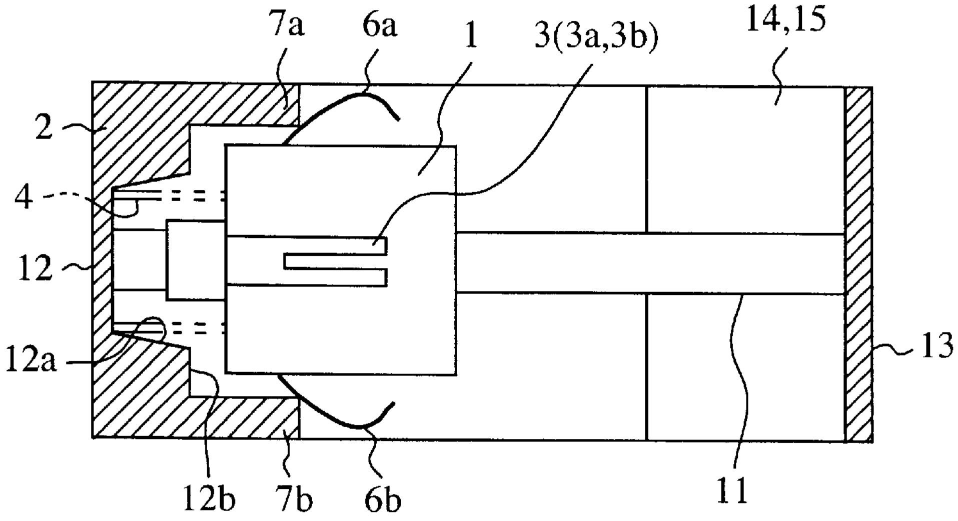
FIG. 3 is a plane sectional view of the acceleration detecting device in FIG. 1 when an acceleration is exerted on the device.

It is preferred that the movable electric contacts are in continual contact with the fixed electric contacts during the travel of the weight 1 in the cavity of the housing 2. Therefore, the spring constant of the coil spring 4, the length of the housing 2 along its longitudinal direction, the length of the fixed electric contacts, and the stroke of the weight 1 are determined on the basis of the maximum extent of expected acceleration or external force. Furthermore, in the embodiment, although the external force is greater than the expected maximum, the decelerating contacts 6*a* and 6*b* can come into contact with the decelerating overhangs 7*a* and 7*b* prior to contact of the weight 1 with the inner surface 12*b* of the end wall 12 as illustrated in FIG. 3 when the weight 1 slides leftward on account of the large given force. Once the decelerating contacts 6*a* and 6*b* come into contact with the decelerating overhangs 7*a* and 7*b*, the braking force is exerted on the weight 1 rightward, so as to decelerate the weight 1. In other word, once the weight 1 travels leftward a distance in excess of a certain amount, decelerating contacts 6*a* and 6*b* and the decelerating overhangs 7*a* and 7*b* commence to cooperate in decelerating the weight 1.

As mentioned above, the decelerating contacts 6*a* and 6*b* are skewed, such that the distance between the center axis of the weight 1 and each decelerating contact increases as the distance from the end wall 12 increases. Therefore, when the weight 1 continues to advance leftward further, the elastic deformation of the decelerating contacts 6*a* and 6*b* incrementally progresses. The reactive force involved in the elastic deformation causes increase of the frictional force between each decelerating overhang and each decelerating contact, thereby increasing the braking force applied to the weight 1. The braking force restrains collision of the weight 1 against the end wall 12.

Consequently, contact of the weight 1 against the end wall 12, which is the stroke termination of the weight 1 in the housing 2, is restrained. If the weight 1 comes into contact with the end wall 12, the electric connection between the electric contacts remains stable since the shock is dampened in advance by the braking force. Thus, in contrast to the prior art, the acceleration detecting device of the embodiment may prevent or restrain oscillation or vibration of the movable electric contacts 3*a* and 3*b* and rebound of the weight 1 without using cushion members, thereby continuing the electrical connection between the electric contacts for a suitable time period when a large acceleration is exerted. In other words, a suitable connection time period can be ensured.

Furthermore, the decelerating contacts 6*a* and 6*b* are formed of a material having a suitable elastic modulus that is not affected by change of temperature significantly, such as a metal and/or plastic material or a combination thereof. The elastic modulus of the decelerating contacts 6*a* and 6*b* can remain substantially unchanged, so as to contribute to achieve the expected braking effect of the decelerating contacts 6*a* and 6*b* even in a vehicle, such as an automobile where inside temperature may vary tremendously. Since the braking force by the decelerating contacts 6*a* and 6*b* relies mainly upon the frictional factor rather than the elastic force factor, the braking force as a whole is not significantly affected by an environmental temperature, thereby ensuring the expected braking effect of the decelerating contacts 6*a* and 6*b*. It is also possible to minimize special structural designs, such as prolongation of the stroke of the weight that causes the rise in the cost of manufacturing.

In the first embodiment, while the fixed brakes or decelerating overhangs 7*a* and 7*b* are configured into rigid structures, the movable brakes or decelerating contacts 6*a* and 6*b* are elastically deformable and are formed into a configuration in which the deformation progresses on account of the travel of the weight 1. However, it is not intended to limit the present invention to the embodiment disclosed herein. On the contrary, it is possible that the movable brakes comprise rigid structures while the fixed brakes are elastically deformable and are configured such that the deformation progresses on account of the travel of the weight 1.

As described above, the acceleration detecting device in accordance with the first embodiment may prevent or restrain oscillation or vibration of the movable electric contacts 3*a* and 3*b* and rebound of the weight 1, thereby continuing the electrical connection between the electric contacts for a suitable time period when a great acceleration is exerted. In other words, a suitable connection time period can be ensured. In addition, since the braking force to the weight 1 mainly relies upon a frictional force, the braking force as a whole is not significantly affected by an environmental temperature, thereby ensuring the expected braking effect. Furthermore, since the decelerating contacts 6*a* and 6*b* are configured such that the deformation progresses incrementally, the reactive force involved in the elastic deformation causes increase of the frictional force between each decelerating overhang and each decelerating contact, thereby incrementally increasing the braking force applied to the weight 1.

Additionally, if the decelerating contacts 6*a* and 6*b* are integral parts of the element that incorporates the movable electric contacts 3*a* and 3*b*, the number of structural elements may be minimized.

Second Embodiment

Figure 5:
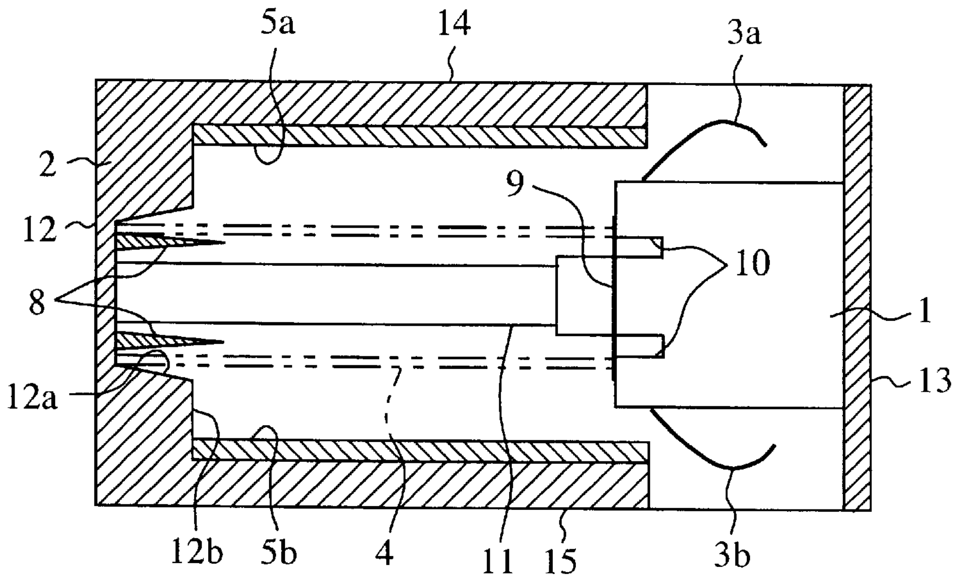
FIG. 5 is a plane sectional view of an acceleration detecting device according to a second embodiment of the present invention when no acceleration is exerted on the device.

FIG. 5 is a sectional view of an acceleration detecting device according to a second embodiment of the present invention when no acceleration is exerted on the device. In FIG. 5, the same reference signs are used for identifying the elements which have been described in conjunction with the first embodiment for simplifying description of the such elements. Unlike the first embodiment, the decelerating contacts 6*a* and 6*b* and the decelerating overhangs 7*a* and 7*b* are excluded in the second embodiment. Instead, the movable electric contacts (movable brakes) 3*a* and 3*b* and the fixed electric contacts (fixed brakes) 5*a* and 5*b* constitute and function as a friction creating mechanism.

As shown in FIG. 5, protrusions 8 (other parts of the friction creating mechanism) extend from the end wall 12 of the housing 2 rightward (toward the left end surface of the weight 1). While the embodiment shown in FIG. 5 includes two protrusions 8, it is not intended to limit the present invention to the illustrated embodiment. Rather, the number of the protrusion(s) 8 may be one, three or more. The protrusions 8 are rigid and may be integrally molded with the end wall 12, so that they constitute a unitary piece.

A planar leaf spring (another part of the friction creating mechanism) 9 is fixedly mounted on the weight 1. The leaf spring 9 is formed of a material having a suitable elasticity and an elastic modulus that is not affected by change of temperature significantly. Preferably, the leaf spring 9 is formed of a metal and/or plastic material or a combination thereof. The left end surface of the weight 1 is continually covered with the leaf spring 9. Preferably, the leaf spring 9 is a unitary part of the conductor element that integrally incorporates the movable electric contacts 3*a* and 3*b*. For example, the movable electric contacts 3*a* and 3*b* may extend from each end of the leaf spring 9 attached to the weight 1 that is a mount section of the unitary integral conductor element.

On the left end surface of the weight 1, one or more depressions 10 of a slit-like configuration are formed. The positions and orientations of the depressions 10 correspond to those of the protrusions 8. FIG. 5 illustrates that the weight 1 has two depressions 10. However, it is not intended to limit the present invention to the disclosure. The number of the depression(s) 10 may coincide with the number of the protrusions 8. Additionally, the shape of each depression 10 may be determined such that the tip of each protrusion 8 may be inserted into the corresponding depression 10 when the weight 1 travels, and it is to be understood that the invention is not to be limited to the disclosed embodiment.

Next, operations of the acceleration detecting device will be described.

When a force greater than a certain amount is exerted leftward, the weight 1 slides on the guide shaft 11 and enters the cavity between the upper and lower walls 14 and 15 of the housing 2. When the movable electric contacts 3*a* and 3*b* come into contact with the fixed electric contacts 5*a* and 5*b*, the fixed electric contacts Sa and 5*b* are connected electrically with each other, so that an electric power is provided to an end effector, for example, an air bag activator. In other words, it can be detected that an acceleration that is greater than a predetermined amount is applied.

Figure 6:
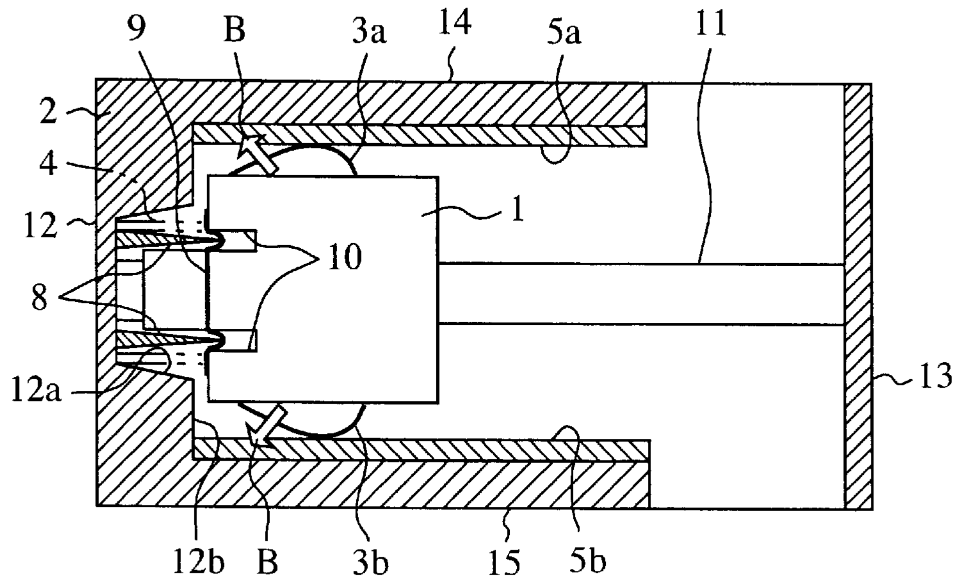
FIG. 6 is a side sectional view of the acceleration detecting device in FIG. 5 when an acceleration is exerted on the device.
Figure 7:
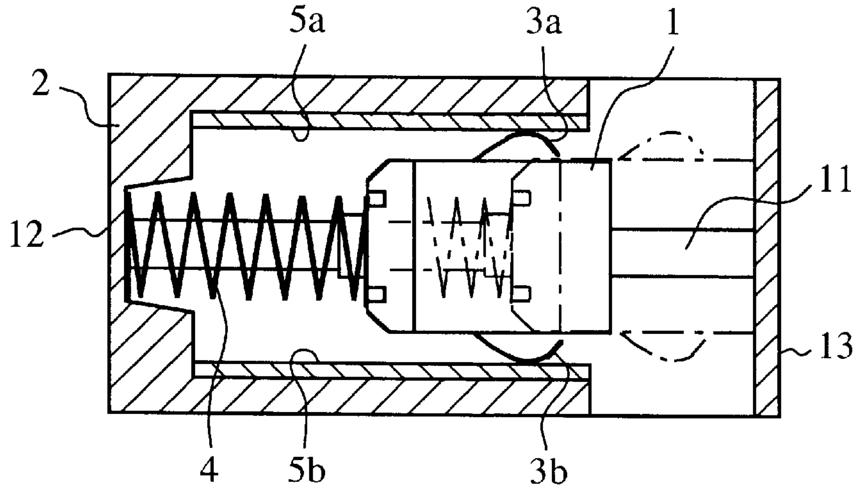
FIG.7 (PRIOR ART)
FIG. 7 is a side sectional view of a conventional acceleration detecting device.
Figure 8:
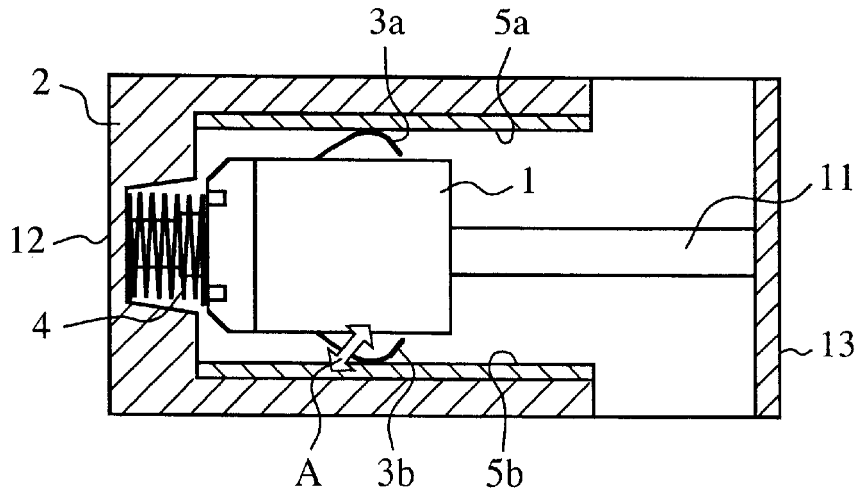
FIG.8 (PRIOR ART)
FIG. 8 is a side sectional view of the acceleration detecting device in FIG. 7 when a weight advances into a cavity of a housing deeply.

In FIG. 6, each arrow B indicates a force applied by the movable electric contact 3*a* or 3*b* to the fixed electric contact 5*a* or 5*b*. The movable electric contacts 3*a* and 3*b* are formed of a suitable elastic material into leaf springs. The maximum distance between the movable electric contacts 3*a* and 3*b* is greater than the interval between the upper and lower walls 14 and 15 when the weight 1 exists outside the cavity of the housing 2. Accordingly, while the weight 1 exists in the cavity, an oblique outward force is continually given by each movable electric contact 3*a* or 3*b* to each fixed electric contact 5*a* or 5*b* as indicated by arrow B, preventing the electric interconnection between the electric contacts from being severed.

It is preferred that the movable electric contacts are in contact with the fixed electric contacts continually during the travel of the weight 1 in the cavity of the housing 2. Therefore, the spring constant of the coil spring 4, the length of the housing 2 along its longitudinal direction, the length of the fixed electric contacts, and the stroke of the weight 1 are determined on the basis of the maximum extent of expected acceleration or external force. Furthermore, in the embodiment, although the external force is greater than the calculated maximum, the leaf spring 9 can come into contact with the protrusions 8 prior to contact of the weight 1 with the inner surface 12*b* of the end wall 12 as illustrated in FIG. 6 when the weight 1 slides leftward on account of the large given force. Once the leaf spring 9 comes into contact with the protrusions 8, the braking force is exerted on the weight 1 rightward, so as to decelerate the weight 1. In other word, once the weight 1 travels leftward a length in excess of a certain amount, the leaf spring 9 and the protrusions 8 commence to cooperate in decelerating the weight 1.

Furthermore, since the depressions 10 are formed on the positions, which correspond to the protrusions 8, on the left end surface of the weight 1, the protrusions 8 may move into the depressions 10 while deforming the leaf spring 9 when the leaf spring 9 on the weight 1 comes into contact with the protrusions 8. When the weight 1 continues to advance leftward further, the elastic deformation of the leaf spring 9 incrementally progresses, thereby dampening the shock to the weight 1.

In addition, since the leaf spring 9 and the movable electric contacts 3*a* and 3*b* constitutes a unitary integral element, the elastic deformation or curvature creates a force indicated by arrow B of FIG. 6, the force being exerted on the movable electric contacts 3*a* and 3*b* outwardly, so as to press the movable electric contacts 3*a* and 3*b* against the fixed electric contacts 5*a* and 5*b* at an increased pressure. The resultant force may increase as the weight 1 progresses leftward. Consequently, the frictional force between each movable electric contact and each fixed electric contact increases, thereby increasing the braking force applied to the weight 1. The braking force restrains collision of the weight 1 against the end wall 12.

Consequently, contact of the weight 1 against the end wall 12, which is the stroke termination of the weight 1 in the housing 2, is restrained. If the weight 1 comes into contact with the end wall 12, the electric connection between the contacts remains stable since the shock is dampened in advance by the braking force. Thus, in contrast to the prior art, the acceleration detecting device of the embodiment may prevent or restrain oscillation or vibration of the movable electric contacts 3*a* and 3*b* and rebound of the weight 1 without using cushion members, thereby continuing the electrical connection between the contacts for a suitable time period when a large acceleration is exerted. In other words, a suitable connection time period can be ensured.

Furthermore, the leaf spring 9 and the movable electric contacts 3*a* and 3*b* are formed of a material having a suitable elastic modulus that is not affected by change of temperature significantly, such as a metal and/or plastic material or a combination thereof The elastic modulus of the leaf spring 9 and the movable electric contacts 3*a* and 3*b* can remain substantially unchanged, so as to contribute to achieve the expected braking effect even in a vehicle, such as an automobile where inside temperature may vary tremendously. Since the braking force by the movable electric contacts 3*a* and 3*b* relies mainly upon the frictional factor rather than the elastic force factor, the braking force as a whole is not significantly affected by an environmental temperature, thereby ensuring the expected braking effect by the movable electric contacts 3*a* and 3*b*. It is also possible to minimize special structural designs, such as elongation of the stroke of the weight that causes the rise in the cost of manufacturing.

The material of the movable electric contacts 3*a* and 3*b* and the leaf spring 9 and the configurations of the protrusions 8 and the depressions 10 of the weight 1 are selected appropriately, in such a manner that the movable electric contacts 3*a* and 3*b* and the leaf spring 9 in a unitary body may restitute or return to their original shape after they are bent. Accordingly, the weight 1 may travel again into the cavity between the fixed electric contacts 5*a* and 5*b* in the housing 2, so that the movable electric contacts 3*a* and 3*b* may come into contact with the fixed electric contacts 5*a* and 5*b* again although the weight 1 has rebounded from the end wall 12 of the housing 2 and has left the cavity. Therefore, it is possible to prevent the weight 1 from stopping at a position where the electric contacts are disconnected from each other. The electrical connection between the electric contacts may be continued for a suitable time period when a large acceleration is exerted. In other words, a suitable connection time period can be ensured.

As described above, the acceleration detecting device in accordance with the second embodiment may prevent or restrain oscillation or vibration of the movable electric contacts 3*a* and 3*b* and rebound of the weight 1, thereby continuing the electrical connection between the electric contacts for a suitable time period when a large acceleration is exerted. In other words, a suitable connection time period can be ensured. In addition, since the braking force to the weight 1 mainly relies upon the frictional force, the braking force as a whole is not significantly affected by an environmental temperature, thereby ensuring the expected braking effect.

Furthermore, since the movable electric contacts 3*a* and 3*b* are configured such that the deformation progresses incrementally, the reactive force involved in the elastic deformation causes increase of the frictional force between each fixed electric contact and each movable electric contact, thereby incrementally increasing the braking force applied to the weight 1.

Additionally, the depressions 10 formed on the weight enables the leaf spring 9 to deform elastically at a large degree, so that the movable electric contacts 3*a* and 3*b* (movable brakes) integrally attached with the leaf spring 9 gives a large amount of braking force to the fixed electric contacts 5*a* and 5*b* (fixed brakes). This contributes in enhancing the capability for braking the weight.

Additionally, if the leaf spring 9 is integral parts of the element that incorporates the movable electric contacts 3*a* and 3*b*, the bending moment involved in the deformation of the leaf spring 9 can be readily transmitted to the movable electric contacts 3*a* and 3*b*, so as to cause deformation of the movable electric contacts 3*a* and 3*b* efficiently. This enables the movable electric contacts 3*a* and 3*b* to give a frictional force to the fixed electric contacts 5*a* and 5*b* securely.

Furthermore, in accordance with the second embodiment, since the movable brakes are movable electric contacts 3*a* and 3*b* and the fixed brakes are fixed electric contacts 5*a* and 5*b*, the number of structural elements may be minimized.

While the present invention has been particularly shown and described with references to preferred embodiments thereof, it will be understood by those skilled in the art that various changes in form and details may be made therein without departing from the spirit and scope of the invention as defined by the claims. Such variations, alterations, and modifications are intended to be as equivalents encompassed in the scope of the claims.

What is claimed is:

1. An acceleration detecting device comprising:

a movable weight;

a movable electric contact disposed on the weight;

a fixed electric contact on which the movable electric contact slides when a force is given to the weight for moving the weight in a first direction, wherein the movable electric contact first contacts the fixed electric contact after the weight travels a first predetermined distance in the first direction;

a resilient member for urging the weight continually in a second direction opposing to the first direction; and a friction creating mechanism for initiating a frictional force to the weight when the weight travels a second predetermined distance in the first direction beyond the first predetermined distance, the friction creating mechanism increasing the frictional force as the weight continues to advance further in the first direction.

2. An acceleration detecting device according to claim 1, wherein the friction creating mechanism includes a fixed brake fixedly arranged in place and a movable brake disposed on the weight, the movable brake coming into contact with the fixed brake for initiating to give a frictional force to the fixed brake when the weight travels at least the second predetermined distance.

3. An acceleration detecting device according to claim 2, wherein at least one of the fixed brake and the movable brake is elastically deformable and is capable of generating a frictional component derived from elastic deformation thereof as a component of the frictional force.

4. An acceleration detecting device according to claim 3, wherein the elastic deformation of at least one of the fixed brake and the movable brake progresses as the weight continues to advance further in the first direction after the movable brake comes into contact with the fixed brake.

5. An acceleration detecting device according to claim 2, wherein the movable brake is formed as an integral part of an element that incorporates the movable electric contact.

6. An acceleration detecting device comprising:

a movable weight;

a movable electric contact disposed on the weight;

a fixed electric contact on which the movable electric contact slides when a force is given to the weight for moving the weight in a first direction;

a resilient member for urging the weight continually in a second direction opposing to the first direction; and a friction creating mechanism for giving a frictional force to the weight when the weight travels a distance in excess of a certain amount in the first direction, the friction creating mechanism increasing the frictional force as the weight continues to advance further in the first direction; and wherein the friction creating mechanism includes:

a protrusion fixedly arranged in place;

a leaf spring disposed on the weight, the leaf spring coming into contact with the protrusion for commencing to deform elastically when the weight travels a distance in excess of a certain amount in the first direction;

a fixed brake fixedly arranged in place; and a movable brake capable of being in contact with the fixed brake, the movable brake deforming and increasing the frictional force to the fixed brake in accordance with an increase of elastic deformation of the leaf spring.

7. An acceleration detecting device according to claim 6, wherein a depression is formed on the weight for receiving the protrusion so as to enable the leaf spring to deform elastically by the protrusion after the leaf spring comes into contact with the protrusion.

8. An acceleration detecting device according to claim 6, wherein the leaf spring is formed as an integral part of an element that incorporates the movable brake.

9. An acceleration detecting device according to claim 6, wherein the movable brake is the movable electric contact while the fixed brake is the fixed electric contact.

10. An acceleration detecting device comprising:

a housing having a cavity and a longitudinal axis;

a weight movable within the cavity along the longitudinal axis;

a movable electric contact disposed on the weight;

a fixed electric contact on which the movable electric contact slides when a force is given to the weight for moving the weight in a first direction, wherein the movable electric contact first contacts the fixed electric contact after the weight travels a first predetermined distance in the first direction; and a friction creating mechanism for initiating a frictional force to the weight when the weight travels a second predetermined distance in the first direction beyond the first predetermined distance, the friction creating mechanism increasing the frictional force as the weight continues to advance further in the first direction.

11. The acceleration detecting device according to claim 10, wherein the friction creating mechanism includes an elastic element and a cavity narrowing element, wherein the cavity narrowing element narrows the cavity at a position along the longitudinal axis at which the friction creating mechanism is initiated, and wherein the elastic element contacts the cavity narrowing element so as to initiate the friction creating mechanism.

12. The acceleration detecting device according to claim 10, further comprising a resilient member for urging the weight continually in a second direction opposing to the first direction.

* * * * *